United States Patent [19]

Suzuki et al.

[11] Patent Number: 4,695,557
[45] Date of Patent: Sep. 22, 1987

[54] CATALYST FOR POLYMERIZATION OF OLEFINS

[75] Inventors: Shigeo Suzuki; Yoshiharu Doi; Kazuo Soga, all of Kanagawa, Japan

[73] Assignee: Toa Nenryo Kogyo Kabushiki Kaisha, Tokyo, Japan

[21] Appl. No.: 875,145

[22] Filed: Jun. 17, 1986

[30] Foreign Application Priority Data

Jun. 18, 1985 [JP] Japan .................................. 60-130885

[51] Int. Cl.$^4$ ................................................ C08F 4/68
[52] U.S. Cl. ..................................... 502/103; 502/125; 526/169.2
[58] Field of Search ................................ 502/103, 125

[56] References Cited

U.S. PATENT DOCUMENTS

| | | | |
|---|---|---|---|
| 3,062,797 | 11/1962 | Stanek | 502/103 X |
| 3,113,115 | 12/1963 | Ziegler et al. | 502/103 |
| 3,483,173 | 12/1969 | Natta et al. | 502/103 X |
| 3,586,638 | 6/1971 | Hsieh | 502/103 X |

FOREIGN PATENT DOCUMENTS 799392 8/1958 United Kingdom ................ 502/103

*Primary Examiner*—Patrick P. Garvin
*Attorney, Agent, or Firm*—M. B. Kurtzman

[57] ABSTRACT

A catalyst for polymerization of olefins which comprises a vanadium compound of the formula:

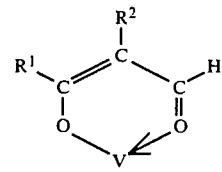

(where $R^1$ is an alkyl group or aryl group having 1 to 8 carbon atoms; and $R^2$ is an alkyl group or aryl group having from 1 to 8 carbon atoms, or hydrogen)

and the organoaluminum compound of the formula $R_2AlX$ (where R is a hydrocarbon group having 1 to 8 carbon atoms, and X is a halogen atom).

7 Claims, No Drawings

CATALYST FOR POLYMERIZATION OF OLEFINS

DETAILED DESCRIPTION OF THE INVENTION

1. Field of Industrial Application

The present invention relates to a catalyst for the living polymerization of olefins such as propylene.

2. Prior Art

The present inventors had previously found that the living polymerization proceeds to give a nearly monodisperse polymer when propylene is polymerized using a catalyst composed of V(acetylacetonate)$_3$ and Al(C$_2$H$_5$)$_2$Cl. [Macromolecules, 12, 814 (1979)]

This catalyst, however, has a disadvantage of being poor in polymerization activity, because only several percent of vanadium in the catalyst forms the active site for polymerization and the growth reaction of polymer chain is slow.

PROBLEMS TO BE SOLVED BY THE INVENTION

Object of the invention

It is an object of the present invention to provide a vanadium-based catalyst for the polymerization of olefins which has a high polymerization activity per unit amount of vanadium.

MEANS TO SOLVE THE PROBLEMS

Summary of the invention

The present inventors found that the object of the invention is achieved by using as a catalyst component a vanadium compound in which β-ketoaldehyde is a chelate in place of the previous vanadium compound in which β-diketone is a chelate. The present invention was completed on the basis of this finding.

Accordingly, the gist of this invention resides in a catalyst for polymerization of olefins which comprises a vanadium compound of the formula:

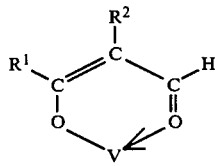

(where R$^1$ is an alkyl group or aryl group having 1 to 8 carbon atoms; and R$^2$ is an alkyl group or aryl group having 1 to 8 carbon atoms, or hydrogen) and an organoaluminum compound and preferably of the formula R$_2$AlX (where R is a hydrocarbon group having 1 to 8 carbon atoms, and X is a halogen atom).

Polymerization catalyst

The polymerization catalyst of this invention is composed of a β-ketoaldehyde vanadium chelate (referred to as the vanadium compound hereinafter) of the formula below:

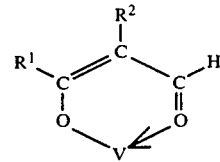

(where R$^1$ and R$^2$ are defined as above) and an aluminum compound of the formula R$_2$AlX (where R and X are defined as above).

Illustrative, but non-limiting, examples of the vanadium compound include V(3-oxobutanalate)$_3$, V(2-methyl-3-oxobutanalate)$_3$, V(2-ethyl-3-oxopentanalate)$_3$, and V(2-phenyl-3-oxobutanalate)$_3$.

Illustrative, but non-limiting, examples of the aluminum compound include dimethyl aluminum chloride, diethyl aluminum chloride, diethyl aluminum bromide, and diisobutyl aluminum chloride.

The polymerization catalyst of this invention is used for the living polymerization of olefins and preferably propylene.

Living polymerization of olefins

The living polymerization is performed by homopolymerizing one or more olefins and preferably propylene or copolymerizing propylene with other olefins in the presence of the polymerization catalyst of the invention.

Examples of the olefin include ethylene, and alpha-olefins such as 1-butene, 1-pentene, 1-hexene, and 4-methyl-1-pentene. The polymerization catalyst of this invention is especially useful for the homopolymerization of propylene and the copolymerization of propylene with ethylene or an alpha-olefin other than propylene (referred to as the comonomer hereinafter).

The copolymerization of propylene with a comonomer is accomplished by random copolymerization of propylene and comonomer, block copolymerization of propylene homopolymer and comonomer, or block copolymerization of a propylene-comonomer random copolymer and comonomer.

The polymerization reaction should preferably be carried out in a solvent which is inert to the polymerization reaction and is liquid at the time of polymerization. Examples of the solvent include saturated aliphatic hydrocarbons such as propane, butane, pentane, hexane, and heptane; saturated alicyclic hydrocarbons such as cyclopropane and cyclohexane; and aromatic hydrocarbons such as benzene, toluene, and xylene.

The homopolymerizaion of propylene or the random copolymerization of propylene with a comonomer should preferably be accomplished by adding in succession of the aluminum compound and a solution of the vanadium compound to a solution of propylene or a solution of propylene and comonomer dissolved in a solvent.

In the homopolymerization of propylene or the random copolymerization of propylene with comonomer, the polymerization catalyst is used in such an amount that the vanadium compound is $1 \times 10^{-6}$ to 0.01 mol, preferably $5 \times 10^{-5}$ to $5 \times 10^{-3}$ mol, and the organoaluminum compound is $1 \times 10^{-4}$ to 0.1 mol, preferably $5 \times 10^{-3}$ to 0.01 mol, for 1 mole of propylene or 1 mol of propylene and comonomer in combination. In addition, the amount of the organoaluminum compound should be 10 to 1000 mol for 1 mol of the vanadium compound.

The molecular weight and yield of the living propylene homopolymer or the living propylene random copolymer may be properly adjusted by changing the reaction temperature and reaction time. If the polymerization temperature is low, particularly below −60° C., the resulting polymer has a molecular weight distribution which is close to that of monodisperse polymer. Polymerization at −65° C. or below affords a living polymer having an $\overline{M}w/\overline{M}n$ of 1.05 to 1.50 (where $\overline{M}w$ is the weight-average molecular weight and $\overline{M}n$ is the number-average molecular weight).

The polymerization reaction permits the use of a reaction accelerator such as anisole, water, alcohols (methanol, ethanol, isopropanol, etc.), the esters (ethyl benzoate, ethyl acetate, etc.). The reaction accelerator is used usually in an amount of 0.1 to 2 mol for 1 mol of the vanadium compound.

The comonomer in the living random copolymer of propylene and comonomer usually accounts for up to 80 wt%. This amount can be adjusted by changing the amount of comonomer used at the time of living polymerization. When the amount of comonomer, especially ethylene, is increased, the resulting copolymer has a broad molecular weight distribution. Where a living copolymer of high ethylene content with a narrow molecular weight distribution is to be produced, polymerization should preferably be performed in the following manner. That is, living polymerization for a very small amount of propylene should be performed before living copolymerization for propylene and ethylene. This permits the introduction of a large amount of ethylene into the copolymer, while keeping the molecular weight distribution of the living copolymer narrow. This polymerization method is illustrated with an example below. At first, propylene alone is supplied to the polymerization system to produce living polypropylene having a number-average molecular weight of preferably 500 to 2,000. Then, ethylene is supplied in the presence of a large amount of unreacted propylene monomer to continue living polymerization until the random copolymerization of ethylene and propylene comes to an end.

The thus obtained living homopolymer of propylene or living random copolymer of propylene and comonomer is made into a living block copolymer by living polymerization with a comonomer. This is accomplished by supplying a comonomer (which is different from the one used in the living random copolymerization with propylene) to the system in which the living homopolymer or living random copolymer and propylene are present, and performing living polymerization in the same manner as mentioned above. Usually, the comonomer accounts for up to 50 wt% in the block portion of the block copolymer. This amount can be adjusted by changing the amount of the comonomer used at the time of block copolymerization.

According to the above-mentioned method, it is possible to produce a living propylene polymer having a number-average molecular weight (in terms of propylene [to be repeated hereinafter]) of about 500 to about 1,000,000 which is similar to that of monodisperse polymers.

EFFECT OF THE INVENTION

The polymerization catalyst of this invention, when used for living polymerization of propylene, exhibits ten times to several tens times higher polymerization activity than the conventional V(acetylacetonate)$_3$ catalyst.

EXAMPLES

The invention is described in more detail with reference to the following examples. The following methods were applied to characterize the resulting polymers.

Molecular weight and molecular weight distribution: Measured by the use of GPC (gel permeation chromatography), Model 150, made by Waters Co., Ltd. The solvent was trichlorobenzene. Measuring conditions: 135° C., solvent flow rate=1.0 ml/min, and sample concentration=0.15 wt/vol%. The column was GMH6 made by Toyo Soda Mfg. Co., Ltd. A calibration curve for polystyrene was made for the standard sample of monodisperse polystyrene available from Waters Co., Ltd. On the basis of this calibration curve, a calibration curve for the polypropylene was made according to the universal method.

Stereoregularity of polymer: Determined by means of $^{13}$C NMR analysis. Model XL-200 with PFT (pulse Fourier transform unit), made by Varian Co., Ltd. Conditions: 50 MHz, 120° C., pulse width 8.2 $\mu s$ $\pi/3$, pulse interval 4 seconds, and integration 5000 times. The sample was dissolved in a 2:1 mixed solvent of trichlorobenzene and heavy benzene.

EXAMPLE 1

In a 200 ml autoclave, with atmosphere therein completely replaced with nitrogen gas, was placed toluene as a solvent, followed by cooling to −70° C. At this temperature, 35 g (0.83 mol) of propylene was added and dissolved in the toluene. Then, 20 mmol of Al(C$_2$H$_5$)$_2$Cl dissolved in toluene and 0.05 mmol of V(2-methyl-3-oxobutanalate)$_3$ dissolved in toluene were added to start polymerization at −70° C. Three hours later, the reaction solution was poured into cooled ethanol (−78° C.) to precipitate the polymer. The resulting polymer was washed five times with 500 ml of ethanol, followed by drying. The polymer (0.78 g) thus obtained was found to have a molecular weight and molecular weight distribution of $\overline{M}n=17,000$ and $\overline{M}w/\overline{M}n=1.3$, respectively. It was a nearly mono-disperse polymer.

The examination of the resulting polymer for stereoregularity indicated that the syndiotactic fraction was 0.79, which is almost equal to that of polymers obtained with the conventional V(actylacetonate)$_3$.

COMPARATIVE EXAMPLE 1

The polymerization of propylene was performed in the same manner as in Example 1, except that the V(2-methyl-3-oxobutanalate)$_3$ was replaced by V(acetylacetonate)$_3$. The yield of the polymer was 0.08 g, $\overline{M}n=30,000$, and $\overline{M}w/\overline{M}n=1.2$.

EXAMPLES 2 TO 6

The polymerization of propylene was performed in the same manner as in Example 1, except that the polymerization time and the amount of polymerization catalyst were changed as shown in Table 1 and the polymerization temperature was changed to −78° C. The results are shown in Table 1.

TABLE 1

| Example | Polymerization time (h) | Catalyst Al (mmol) | Catalyst V (mmol) | Yield (g) | $\overline{M}n$ | $\overline{M}w/\overline{M}n$ |
|---------|------|------|------|------|-------|------|
| 2 | 3 | 5.0 | 0.5 | 0.21 | 6,700 | 1.3 |

TABLE 1-continued

| Example | Polymerization time (h) | Catalyst Al (mmol) | Catalyst V (mmol) | Yield (g) | $\overline{Mn}$ | $\overline{Mw}/\overline{Mn}$ |
|---|---|---|---|---|---|---|
| 3 | 6 | 5.0 | 0.5 | 3.07 | 73,000 | 1.3 |
| 4 | 32 | 5.0 | 0.05 | 0.70 | 13,000 | 1.2 |
| 5 | 6 | 20.0 | 0.1 | 0.42 | 17,000 | 1.2 |
| 6 | 6 | 5.0 | 0.1 | 0.14 | 9,800 | 1.5 |

EXAMPLE 7

The polymerization of propylene was performed in the same manner as in Example 5, except that 0.05 mmol of anisol was added to the polymerization system. The yield of the polymer was 0.58 g, $\overline{Mn}=17,000$, and $\overline{Mw}/\overline{Mn}=1.2$.

EXAMPLE 8

The polymerization of propylene was performed in the same manner as in Example 6, except that 0.05 mmol of water was added to the polymerization system. There was obtained 0.24 g of polypropylene having $\overline{Mn}=15,000$ and $\overline{Mw}/\overline{Mn}=1.3$.

EXAMPLE 9

The polymerization of propylene was performed for 22 hours in the same manner as in Example 6, except that V(3-oxobutanalate)$_3$ was used as the vanadium compound. There was obtained 1.4 g of polypropylene having $\overline{Mn}=71,000$ and $\overline{Mw}/\overline{Mn}=1.3$.

What is claimed is:

1. A catalyst system comprising a vanadium chelate of a beta-ketoaldehyde and an organoaluminum compound.

2. The catalyst system of claim 1 wherein the vanadium chelate is represented by the formula:

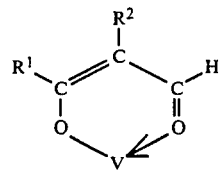

wherein $R^1$ is an alkyl or aryl group having 1 to 8 carbon atoms and $R^2$ is an alkyl or aryl group having from 1 to 8 carbon atoms or hydrogen and the organoaluminum compound is represented by the formula $R_2AlX$ wherein R is a hydrocarbyl group having from 1 to 8 carbon atoms and X is a halogen.

3. The catalyst system of claim 2 wherein the vanadium chelate is one of V(2-methyl-3-oxobutanalate)$_3$, V(3-oxobutanalate)$_3$, V(2-ethyl-3-oxopentanalate)$_3$ and V(2-phenyl-3-oxobutanalate)$_3$.

4. The catalyst system of claim 3 wherein the vanadium chelate is one of V(2-methyl-3-oxobutanalate)$_3$ and V(3-oxobutanalate)$_3$.

5. The catalyst system in accordance with claim 2 wherein the organoaluminum compound is one of dimethyl aluminum chloride, diethyl aluminum chloride, diethyl aluminum bromide and diisobutyl aluminum chloride.

6. The catalyst system of claim 5 wherein the aluminum compound is diethyl aluminum chloride.

7. The catalyst system of claim 2 wherein the range of organoaluminum compound to vanadium chelate is in the range of 10–1,000:1 on a mol basis.

* * * * *